United States Patent [19]

Takenaka et al.

[11] 4,415,168
[45] Nov. 15, 1983

[54] MECHANICAL SEAL

[75] Inventors: Akira Takenaka; Tatsuhiko Fukuoka, both of Toyota, Japan

[73] Assignee: Taiho Kogyo Co., Ltd., Aichi, Japan

[21] Appl. No.: 366,809

[22] Filed: Apr. 8, 1982

Related U.S. Application Data

[63] Continuation of Ser. No. 133,713, Mar. 25, 1980, abandoned, which is a continuation-in-part of Ser. No. 895,072, Apr. 10, 1978, abandoned.

[30] Foreign Application Priority Data

Apr. 12, 1977 [JP] Japan .................................. 52-41838
Mar. 3, 1978 [JP] Japan .................................. 53-24137
Mar. 4, 1978 [JP] Japan .................................. 53-24138

[51] Int. Cl.³ ............................................. F16J 15/34
[52] U.S. Cl. ..................................... 277/96.1; 277/26
[58] Field of Search ...................... 277/23, 74, 75, 96, 277/96.1

[56] References Cited

U.S. PATENT DOCUMENTS

| | | | |
|---|---|---|---|
| 2,858,149 | 10/1958 | Laser | 277/96.1 |
| 2,919,148 | 12/1959 | Smith | 277/23 |
| 3,524,654 | 8/1970 | Massfelbacher et al. | 277/96.1 |
| 4,196,911 | 4/1980 | Matsushita | 277/74 |

Primary Examiner—Robert I. Smith
Attorney, Agent, or Firm—Flynn, Thiel, Boutell & Tanis

[57] ABSTRACT

A mechanical seal comprises a seating ring and a follower ring. The seating ring receives therethrough a rotatable shaft and forms a stationary member and the follower ring is rotated together with the rotatable shaft in sliding contact with the seating ring. The seal is serviceable for avoiding the leakage of pressurized sealed fluid from the outside of the sliding contact portion between both the rings to the inside thereof. At least one of the sliding contact surfaces of both the rings has an outside raised portion along the periphery of the sliding contact surface. The raised portion is swollen in the direction of the axis of the rotatable shaft as compared with the inside portion of the sliding contact surface. Since the contact surface pressure in the peripheral portion of both the rings becomes high at the normal temperature by the provision of the outside raised form, the sealing effect can be improved especially during the stoppage of the follower ring. When the follower ring is subjected to the frictional heat due to its rotation, the follower ring is deformed in the direction in which the contact surface pressure becomes even. Therefore, the effect of sealing during the rotation is also improved.

8 Claims, 14 Drawing Figures

F I G. 1
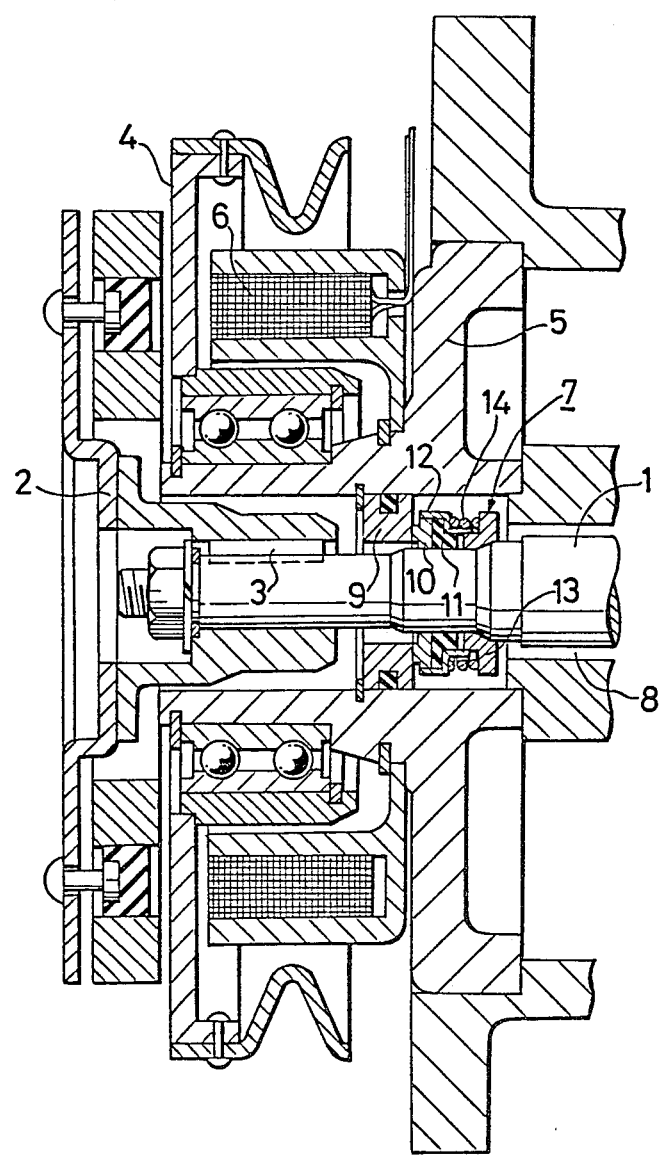

MECHANICAL SEAL,,p

This is a continuation, of application Ser. No. 133,713 filed Mar. 25, 1980, in turn a continuation-in-part of application Ser. No. 895,072, filed Apr. 10, 1978 both of which are now abandoned.

BACKGROUND OF THE INVENTION

This invention relates to an improvement in a mechanical seal which prevent the leakage of fluid through relatively rotatable sliding contact surfaces. There are many sliding contact portions in industrial machinery such as the compressors of car coolers and other pumping and compressing apparatus for fluids. As is well known when considering the operation of a mechanical seal in a car cooler or radiator system, the sealed pressurized fluid is either a liquid or a mixture of a gas and a liquid. In such a prior art system, the sealed pressurized fluid is sealed in on the outside of the seal and an external fluid is disposed on the inside of the seal. It is specifically desired to avoid the leakage flow of the pressurized fluid toward the external fluid such as gas. The performance of such sliding contact portions has great influence on the durability and reliability of the machines.

In the ordinary prior art mechanical seal, a follower ring which rotates together with the rotary shaft is brought into sliding contact with a seating ring on the stationary side which is also carried by the rotary shaft. The leakage of a fluid from the outside to the inside of the sliding contact surfaces is avoided by a mechanical means. In order to improve the sealing effect between the contact surfaces, several countermeasures have been taken. For example, the pressure per unit area between the contact surfaces is increased by intensifying the pressure between the seating ring and the follower ring or durable sealing surfaces are formed by selecting the material of contact surfaces. However, it is impossible to avoid the occurrence of coarseness of the contact surfaces and the wear or other changes of the contact surfaces during prolonged use. Especially in the case of the mechanical seal for the compressor of a car cooler or the like, where severe conditions of varying temperature and exerted vibration enhances the probability of the leakage of fluid. Therefore, radical measures against such defects have long been desired.

SUMMARY OF THE INVENTION

The primary object of the present invention is to provide an improved mechanical seal which is free from the disadvantages in the prior art devices and quite effective in practical working.

Another object of the present invention is to provide a mechanical seal in which at least one of the sliding surfaces of a seating ring and a follower ring includes an outside raised portion effective to increase the contact pressure in the peripheral portion of the sliding surface as compared with the contact pressure in the inside portion thereof.

A further object of the present invention is to provide a mechanical seal in which, when the seating ring and the follower ring are deformed by frictional heat caused by the sliding of both the rings, the contact pressure between the sliding surfaces of both the rings is made even by the provision of the above-mentioned outside raised portion of the sliding surface.

As a fundamental measure to achieving the above desired sealing, a mechanical sealing has been proposed wherein at least one of the sliding surfaces of a seating ring and a follower ring includes a plurality of fine grooves which are closed at their outside ends. Further, in accordance with this invention, the seaing effect of the seal is enhanced during the stoppage of the seating ring by forming an outside raised portion along the periphery of the sliding surface which has no fine groove. Thus, the peripheral portion is slightly raised from the level of the inside portion of the sliding surface.

The outside raised portion produces a significant effect in leakage prevention both during the stoppage of the follower ring and during the rotation thereof. The improved sealing effect during the rotation of the follower ring is believed to depend upon the fact that the outside raised form in the sliding surface at the normal temperature compensates for the thermal deformation caused by the sliding rotation of the follower ring. That is, the thermal deformation tends to change the sliding surface into an inside raised form. Therefore, the outside raised portion or form offsets the inside raised form that is caused by the thermal deformation.

The mechanical seal of the invention is especially effective and suitable for the compressor of a car cooler in which the thermal deformation is liable to occur since the operation conditions such as temperature, pressure, rotational number and the sealed fluid are severe.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is a vertical cross-sectional view of an exemplary rotary shaft having a mechanical seal made in accordance with the invention;

DETAILED DESCRIPTION OF THE INVENTION

Figure 2:
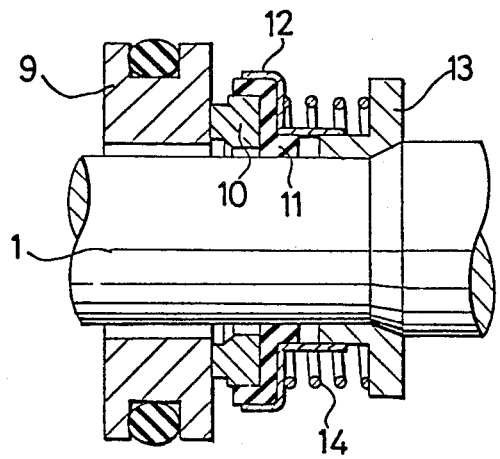
FIG. 2 is an enlarged cross-sectional view of the mechanical seal shown in FIG. 1.

FIG. 1 shows an example of a rotary shaft having the mechanical seal of the present invention. A part, generally designated 15, of compressor for an automobile is shown wherein, as is known, a pressurized fluid is in the compressor section 8. A connecting member 2 of an electromagnetic clutch is axially slidably fitted to the rotary shaft 1 of the compressor via a key 3. The rotating member 4 can be rotated relative to the casing 5. Excitation coils 6 are disposed inside the rotating member 4 and, when coils 6 are energized, rotating member 4 is united with the connecting member 2 so that the rotary shaft 1 is rotated together with the rotating member 4 in a known manner.

The mechanical sealing section 7 prevents leakage of the fluid in the compressor section 8 along rotary shaft 1. A follower ring 10 is slidably engaged with a seating ring 9 which is fitted around rotary shaft 1. The follower ring 10 is rotated together with rotary shaft 1 and the leakage of oil or gas through the gap between rotary shaft 1 and seating ring 9 can be avoided by the above slidable engagement of follower ring 10. The packing 11 is closely fitted to rotary shaft 1 via a keep plate 12 for packing 11 and a knock ring 13. The follower ring 10 is urged toward seating ring 9 by the force of a helical spring 14.

Figure 3:
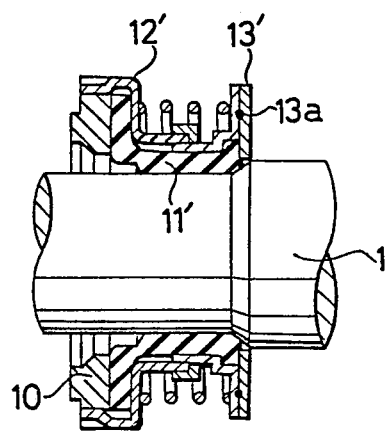
FIG. 3 is an enlarged cross-sectional view of a modified embodiment of the mechanical seal of FIGS. 1 and 2.
Figure 4A:
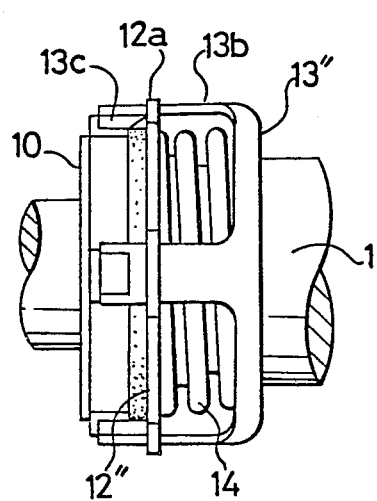
FIGS. 4(A) and 4(B) are side elevational and cross-sectional views, respectively, of another embodiment of a mechanical seal made in accordance with this invention.
Figure 4B:
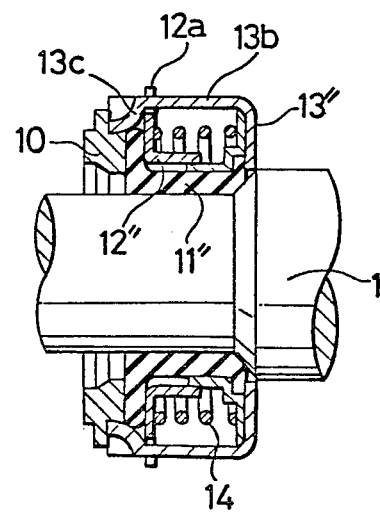

FIG. 2 shows the mechanical sealing section 7 in an enlarged scale. Knock ring 13 shown in FIG. 2 is a relatively thick molded article. Knock ring 13' shown in FIG. 3 is made by bending press work and the spot-welding of portion 13a to make the product simple and light in weight. In FIGS. 4 (A) and 4 (B) the keep plate 12" is formed like a toothed wheel and openings 12a are made in the tooth portions. The knock ring 13" includes a plurality of tongue pieces 13b which extend in parallel to the axis of shaft 1. Tongue pieces 13b are inserted into openings 12a of keep plate 12", thereby preventing tongue pieces 13b from opening outwardly with respect to shaft 1. Further, the free ends 13c of tongue pieces 13b are firmly attached to the peripheral portions of follower ring 10 to avoid the rotation of follower ring 10 with respct to shaft 1.

Figure 5A:
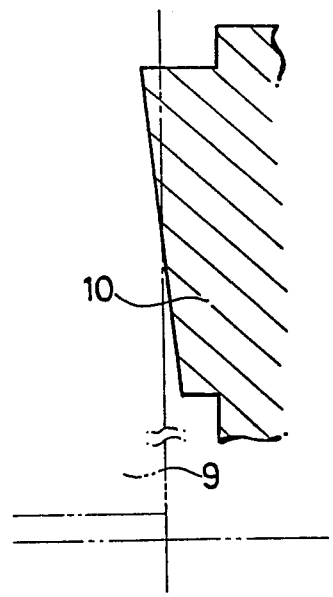
FIGS. 5(A) and 5(B) are exaggerated cross-sectional views of the sliding surfaces of the follower rings in the embodiments of mechanical seals of the present invention.
Figure 5B:
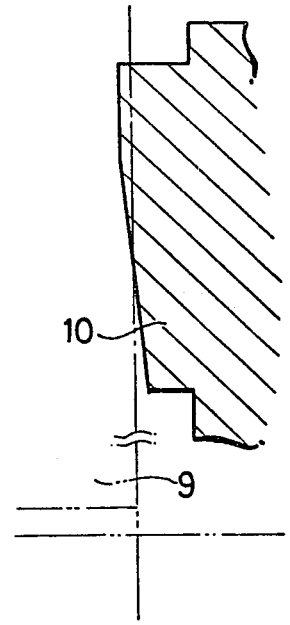

In the mechanical seal of the present invention, the peripheral portion of follower ring 10 and/or seating ring 9 is raised. Each of FIGS. 5 (A) and 5 (B) shows the exaggerated cross-sectional shape of a part of follower ring 10 with the outside raised form during the stoppage (at the normal temperature). That is, the peripheral portion of the sliding surface of follower ring 10 that comes into contact with seating ring 9, is slightly protruded in the direction of shaft 1 from the inside portion of the sliding surface, thereby forming the so-called outside raised portion. The degree of this protrusion, that is, the height of the outside raised portion is made such that, when an imaginary plane that is perpendicular to the shaft is brought into contact with the inside portion of the sliding surface of follower ring 10, the peripheral portion of the sliding surface protrudes by several microns at the most from the imaginary plane.

Figure 6:
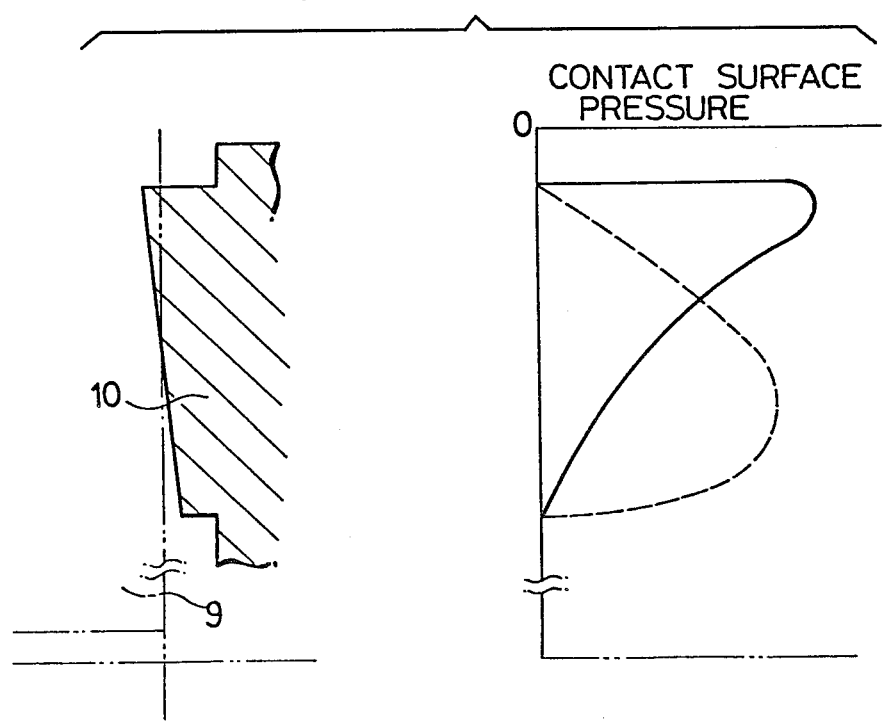
FIG. 6 is a graphic chart correlating the distributions of contact surface pressures between sliding surfaces of the follower ring shown in cross-section.

With this outside raised form, the contact pressure between the peripheral portions of the sliding surfaces of seating ring 9 and follower ring 10 is made higher than that of the inner portions. FIG. 6 schematically shows an example of the distribution of this contact pressure. The sealing effect during the stoppage of follower ring 10 can be enhanced by increasing the contact pressure in the peripheral portion. Even though the reason for this fact is not clear, it is considered that the sealing effect during stoppage can be improved by increasing the contact pressure on the side of high pressure. While, any theoretical elucidation on sealing effect has never been made in the prior art mechanical seal, however, it has been believed that higher sealing effect can be obtained by increasing the surface pressure in or along the inside portion of the sliding surface.

Figure 7A:
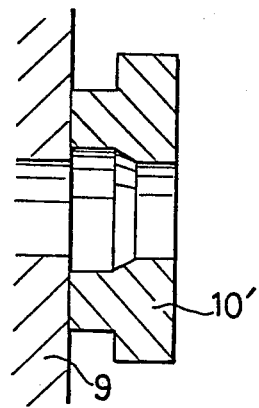
FIGS. 7(A) and 7(B) are exaggerated cross-sectional views of prior art follower rings before and after the occurrence of thermal deformation, respectively
Figure 7B:
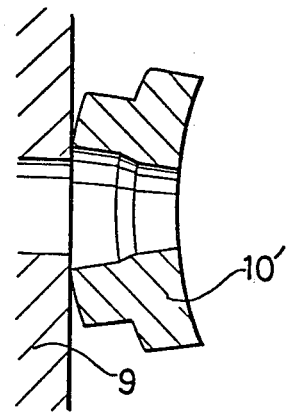
Figure 8A:
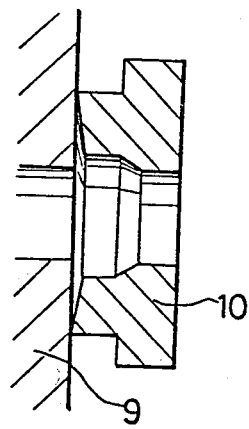
FIGS. 8(A) and 8(B) are exaggerated cross-sectional views of the follower rings of the present invention before and after the occurrence of thermal deformation, respectively.
Figure 8B:
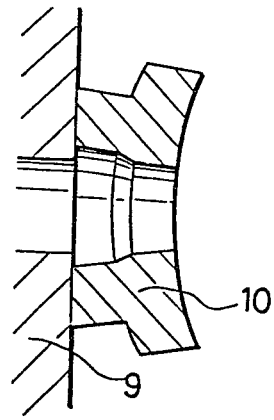

Described in the following is the sealing effect during the rotation of follower ring 10 having the outside raised form. FIG. 7 shows the exaggerated cross-sectional shapes of a prior art follower ring 10' having the sliding surface of a flat plane or inside raised form and FIG. 8 shows the follower ring 10 having the sliding surface of the outside raised form according to the invention. In both the drawings, (A) shows the state in stoppage (at the normal temperature) and (B) shows the state of rotation under the assumption that only follower rings 10' and 10 are subjected to thermal deformation by the sliding contact with seating ring 9.

As shown in the drawings, when the thermal deformation of the prior art follower ring 10' is caused to occur by frictional heat with a rotating seating ring 9, the portion being in contact with the sliding surface of seating ring 9 varies from the whole surface to inside surface or from normal inside contact to stronger inside contact. That is, when follower ring 10' is thermally deformed during its rotation, the sliding surface thereof is changed into the inside raised form. Therefore, only a portion of the sliding surface of follower ring 10' is brought into sliding contact with seating ring 9 under a high contact pressure. Consequently, the roughening, wearing and damaging of sliding surfaces of both follower ring 10' and seating ring 9 are liable to occur. Furthermore, the inside raised form of the sliding surface reduces the contact surface pressure in the peripheral portion of the sliding surfaces, that is, on the side of high pressure sealed fluid. Thus, the effective sealing area in the sliding portion during rotation is reduced, and at the same time, the sealing surfaces are opened toward the high pressure side of the seal causing an increase of leakage of the sealed fluid.

On the other hand, in accordance with the present invention, FIG. 8 shows the sliding surface of follower ring 10 in the shape of the outside raised form. Even when ring 10 is subjected to thermal deformation by the frictional heat with seating ring 9, the contact between the sliding surface of seating ring 9 is varied from the peripheral surface contact to the whole surface contact. Accordingly, the inside surface contact of the prior art member as shown in FIG. 7 is avoided. Therefore, excellent sealing effect can be maintained by the mechanical seal of the present invention.

Further, the height or degree of the outside raised form of follower ring 10 may be so determined as to maintain good sealing effect of the sliding surfaces even when follower ring 10 and seating ring 9 are deformed, by calculating or measuring the values of thermal deformations of the respective follower ring and seating ring. In an example, a follower ring is made of carbon and has an outer diameter of 24 mm$\phi$, an inner diameter of 16 mm$\phi$, a thickness of 3.8 mm. The temperature of the sliding surface was 120° C. and the temperature of the other end face was 80° C. The degree of thermal deformation was about 3 to 4 $\mu$m. Accordingly the height of the outside raised portion on the sliding surface of follower ring 10 may be set to the value of about the same as the above value or a little smaller.

The follower ring 10 of the outside raised form is thermally deformed in a direction such that it comes into contact with seating ring 9 under even contact pressure during the relative rotation between them. Consequently, quite excellent sealing effect can be obtained during the rotation. However, when the height of outside raised form exceeds a certain value, the contact pressure in the peripheral portion becomes even still higher during rotation. Therefore, the sliding surfaces suffer wearing and damage. Accordingly, in the case of the compressor for a car cooler, it is necessary that the height of the outside raised portion may be not larger than several microns.

Figure 9:
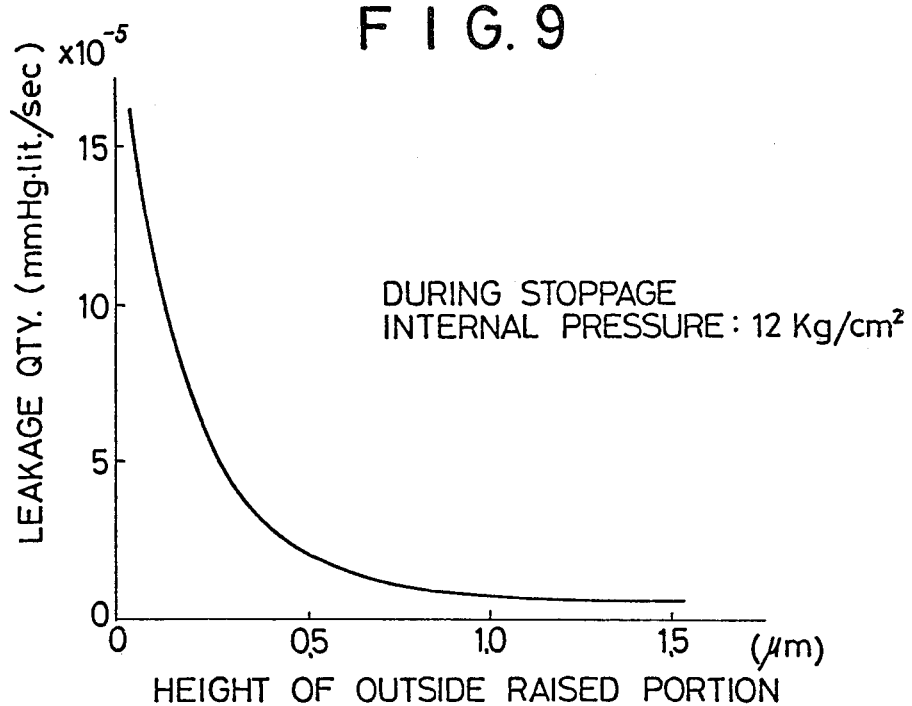
FIGS. 9 and 10 are graphs showing exemplary relations between the leakages and the heights of outside raised portions during the stoppage and rotation of follower rings.
Figure 10:
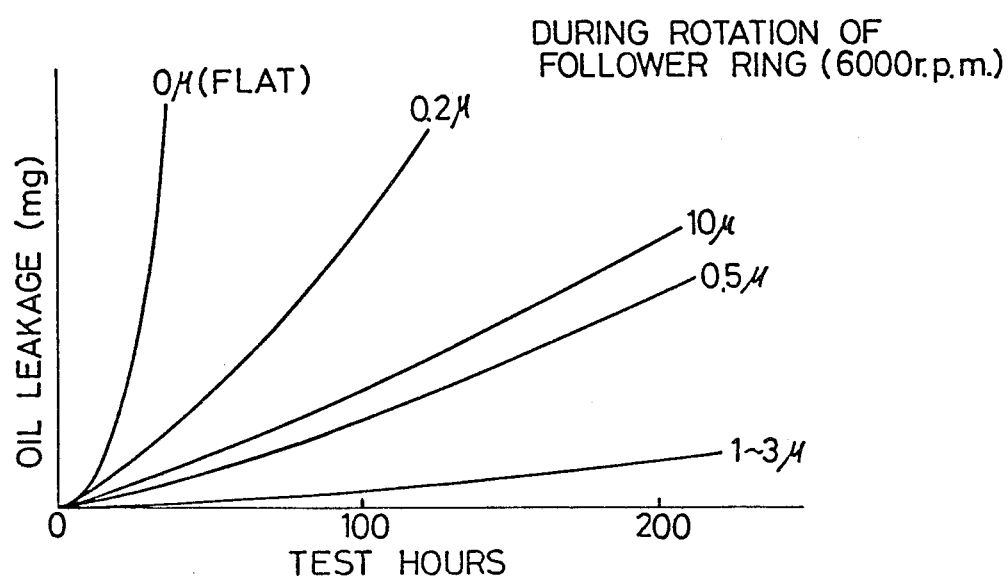

In the following, the effect of the outside raised form will be described with reference to the results of experiments. FIG. 9 shows the relation between the heights of outside raised portions and the gas leakages per unit time during the stoppage of the follower ring of the mechanical seal of a compressor for a car cooler, in which a mixture of gas and oil is sealed (internal pressure: 12 Kg/cm$^2$). According to this result, when the height of outside raised portion becomes 0.5 $\mu$m, the leakage becomes very little and with the increase of the height of the outside raised portion, the leakage is further reduced. Furthermore, FIG. 10 shows the results of comparison of the quantities of oil leakages with the heights of outside raised portions during the rotation of the follower ring at 6,000 r.p.m. During the rotation, as compared with the prior art follower ring having no outside raised portion, the oil leakage can be markedly reduced when the height of outside raised portion is set to 1 to 3 $\mu$m. When the height of outside raised portion exceeds a certain value, there is an inclination that the leakage is increased again.

Further, the outside raised form of the sliding surface may be formed not only on the follower ring but also on both the follower ring and the seating ring or solely on the seating ring. As described above, the height of this outside raised form is determined by considering the thermal deformation during rotation which varies according to the materials, especially to their thermal expansion coefficients, and conditions of use of both the seating ring and follower ring. Thus, the sliding surfaces of both rings are maintained in whole surface contact or slightly outside inclined contact during the rotation of the rings with respect to each other.

ADVANTAGES OF THE INVENTION

The mechanical seal of the present invention as described above can be used widely as the sealing device for a rotary shaft device. Further, it is quite suitable for the compressor of a car cooler in which the follower ring and seating ring are subjected to marked thermal deformation under severe use conditions. That is, in the compressor of this kind, the sealed fluid is a mixture of a coolant gas and a lubricant oil and the quantity of lubricant oil is very small (generally about 200 to 260 c.c.) so as to maintain the cooling capacity. Therefore, the lubricant oil cannot be expected to completely cool the heat produced between the sliding surfaces. Furthermore, the heat produced between the sliding surface is increased because the rotational number of engine is intermittently varied within a wide range. Still further, the pressure of sealed fluid is also varied in accordance with the rotational number of engine. In addition to these, the end faces of seating ring and follower ring that are opposite to the sliding surfaces are exposed to the air or coolant gas. Thus, the temperature differences between the sliding surfaces and other portions becomes very large. Therefore, the thermal deformation and the resultant leakage have a tendency to increase. In accordance with the present invention, since these thermal deformations can be absorbed or offset by the provision of the outside raised form to the sliding surfaces, the present invention gives remarkable effect to enhance the sealing effect.

While the mechanical seal has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A mechanical seal which comprises:
   (a) stationary means including a seating ring which receives therethrough a rotatable shaft and has an annular sliding contact surface, and
   (b) a follower ring mounted to rotate with said rotatable shaft and has another annular sliding contact surface in sliding contact with the sliding contact surface of said seating ring when the shaft is rotated causing relative motion in one direction between said sliding contact surfaces,
   (c) in said mechanical seal, a pressurized fluid which consists of a liquid or a mixture of a gas and a liquid being sealed in on the outside of said follower ring and the inside thereof is connected to the air,
   (d) said mechanical seal being composed of a material that is subject to thermal deformation under high temperature conditions and is effective to avoid the leakage of said pressurized sealed fluid from the outside to the inside thereof,
   (e) a raised portion is disposed along the periphery of said sliding contact surface of the follower ring,
   (f) said raised portion being defined by swelling said periphery in the direction of the axis of said rotatable shaft as compared with the inside portion of said sliding contact surface, and
   (g) the height of said outside raised portion on said sliding contact surface being effective to compensate for thermal deformation taking place during operation of the seal, the axial extent of said raised portion being in the range of about 1 to 3 microns, said raised portion being a circumferentially continuous annular surface, said contact surface having a diametral cross section which continues from the radially inner edge of said contact surface away from the shaft, smoothly and without interruption to and through said raised portion to the radially outer periphery of said contact surface.

2. The mechanical seal as defined in claim 1, wherein said outside raised portion is effective to increase the contact surface pressure in said peripheral portion between both said rings at a normal temperature with respect to the contact surface pressure at said inside portion.

3. The mechanical seal as defined in claim 1, wherein said outside raised portion has a form effective to cause the contact surface pressure between both said rings to be made even when said rings are thermally deformed by sliding contact or the difference between the surface contact pressure in said peripheral portion and that in said inside portion is made small when said rings are thermally deformed by sliding contact.

4. The mechanical seal as defined in claim 1, wherein said follower ring is made of carbon.

5. The mechanical seal as defined in claim 1 in which said follower ring is responsive to heating for deforming in cross section, the deformation being such that the radially outer portion thereof tends to bend away from and its radially inner portion tends to bend toward said seating ring.

6. A combination comprising:
(a) a mechanical seal composed of a material that is subject to thermal deformation under high temperature conditions and including stationary means and a follower ring,
(b) the stationary means including a seating ring which receives therethrough a rotatable shaft and has an annular sliding contact surface,
(c) a follower ring mounted to rotate with said rotatable shaft and has another annular sliding contact surface in slidable contact with the sliding contact surface of said seating ring when the shaft is rotated causing relative motion in one direction between said sliding contact surfaces,
(d) means for sealing in a pressurized fluid which consists of a liquid or a mixture of a gas and a liquid on the outside of the follower ring,
(e) means for connecting the inside of the follower ring to the inside air, said mechanical seal being effective to avoid the leakage of pressurized sealed fluid from the outside of the sliding surfaces of both said rings, to the inside thereof,
(f) said sealing means including a raised portion disposed along the outer periphery of the sliding contact surface and extending in the direction of the axis of the rotatable shaft in an amount sufficient to compensate for thermal deformation taking place along the sliding contact surfaces during operation of the seal and being caused by frictional heat due to sliding contact, the axial extent of said raised portion being in the range of about 1 to 3 microns, said raised portion being a circumferentially continuous annular surface, said contact surface havng a diametral cross section which continues from the radially inner edge of said contact surface away from the shaft, smoothly and without interruption to and through said raised portion to the radially outer periphery of said contact surface.

7. The mechanical seal as defined in claim 6, wherein said outside raised portion is disposed on the sliding contact surface of said follower ring.

8. A combination comprising:
a mechanical seal including stationary means and a follower ring,
the stationary means including a seating ring which receives therethrough a rotatable shaft and has an annular sliding contact surface,
the follower ring being mounted to rotate with said rotatable shaft and has another annular sliding contact surface in slidable contact with the sliding contact surface of said seating ring when the shaft is rotated causing relative motion in one direction between said sliding contact surfaces,
each said annular sliding contact surface having a radially inner portion and a radially outer portion,
means for sealing a pressurized fluid, which consists of a liquid or a mixture of a gas and a liquid, in a zone radially outside of said follower ring, and
means for connecting the radially inside surface of said follower ring to inside air,
at least one of said annular sliding contact surfaces having means cooperative with the other said annular contact surface for avoiding the leakage of said fluid from said outside zone to said inside air with the follower ring stopped, such means being formed by an annular, axially raised portion disposed along the periphery of at least one of the sliding contact surfaces, said axially raised portion being defined by a slight swelling of the radially outer circumferential portion of said at least one sliding contact surface in the axial direction beyond the radially inner circumferential portion thereof while maintaining a small clearance between inner circumferential portion of the sliding contact surfaces to hold therebetween a fluid, said raised portion increasing the surface pressure at the radially outer circumferential portion of said sliding contact surfaces beyond that at the radially inner circumferential portion, the axial extent of said raised portion being in the range of about 1 to 3 microns, said raised portion being a circumferentially continuous annular surface, said one contact surface having a diametral cross section which continues from the radially inner edge of said contact surface away from the shaft, smoothly and without interruption to and through said raised portion to the radially outer periphery of said contact surface.

* * * * *